(12) United States Patent
Huang (10) Patent No.: US 8,895,837 B2
(45) Date of Patent: Nov. 25, 2014

(54) SOLAR CELL MODULE

(75) Inventor: Ting-Hui Huang, Hsinchu (TW)

(73) Assignee: Hulk Energy Technology Co., Ltd., Miaoli County (TW)

( * ) Notice: Subject to any disclaimer, the term of this patent is extended or adjusted under 35 U.S.C. 154(b) by 63 days.

(21) Appl. No.: 13/415,943

(22) Filed: Mar. 9, 2012

(65) Prior Publication Data

US 2013/0125984 A1 May 23, 2013

(30) Foreign Application Priority Data

Nov. 18, 2011 (TW) .............................. 100221905 U (51) Int. Cl.
*H02N 6/00* (2006.01)
*H01L 31/042* (2014.01)
*F24J 2/52* (2006.01)

(52) U.S. Cl.
CPC ............ *H01L 31/0424* (2013.01); *Y02E 10/50* (2013.01); *Y02E 10/47* (2013.01); *F24J 2/5211* (2013.01)
USPC ....................................................... 136/251

(58) Field of Classification Search
CPC F24J 2/5211; H01L 31/0203; H01L 31/0422; H01L 31/0424; H01L 31/048; H01L 31/0488
USPC .................................................. 136/251, 259
See application file for complete search history.

(56) References Cited

U.S. PATENT DOCUMENTS

| | | | |
|---|---|---|---|
| 2006/0207646 A1* | 9/2006 | Terreau et al. ................ | 136/251 |
| 2007/0056625 A1* | 3/2007 | Higuchi et al. ............... | 136/244 |
| 2009/0194098 A1* | 8/2009 | Placer ........................... | 126/704 |
| 2010/0212723 A1* | 8/2010 | Furukawa ...................... | 136/251 |
| 2010/0294340 A1* | 11/2010 | Cunningham et al. ......... | 136/251 |
| 2011/0005579 A1* | 1/2011 | Lee et al. ...................... | 136/251 |

* cited by examiner

*Primary Examiner* — Eli Mekhlin
(74) *Attorney, Agent, or Firm* — WPAT, P.C.; Justin King (57) ABSTRACT

A solar cell module comprises: a cover glass, a glass substrate, an aluminum frame, and a filling material. The glass substrate of the solar cell module is formed in a size smaller than that of the cover glass, whereas the cover glass is arranged above the glass substrate while spacing from the same by a first distance; the space ranged between the perimeter of the cover glass and the perimeter of the glass substrate is filled by the filling material while allowing the cross section of the filling material to be an acute triangle. Moreover, the bottom of the filling material is engaged with a contact end of a lower tongue piece of the aluminum frame that is disposed away from a sidewall of the aluminum frame by a contact point while allowing the contact point to be spaced from the perimeter of the glass substrate by a second distance.

11 Claims, 9 Drawing Sheets

SOLAR CELL MODULE

FIELD OF THE INVENTION

The present invention relates to solar cell technology, and more particularly, to a solar cell module.

BACKGROUND OF THE INVENTION

A solar cell (also called photovoltaic cell or photoelectric cell) is a solid state electrical device that converts the energy of sunlight directly into electricity by the photovoltaic effect. Photovoltaics is the field of technology and research related to the practical application of photovoltaic cells in producing electricity from light, and therefore cells are described as photovoltaic cells when the light source is not necessarily sunlight.

Figure 1:
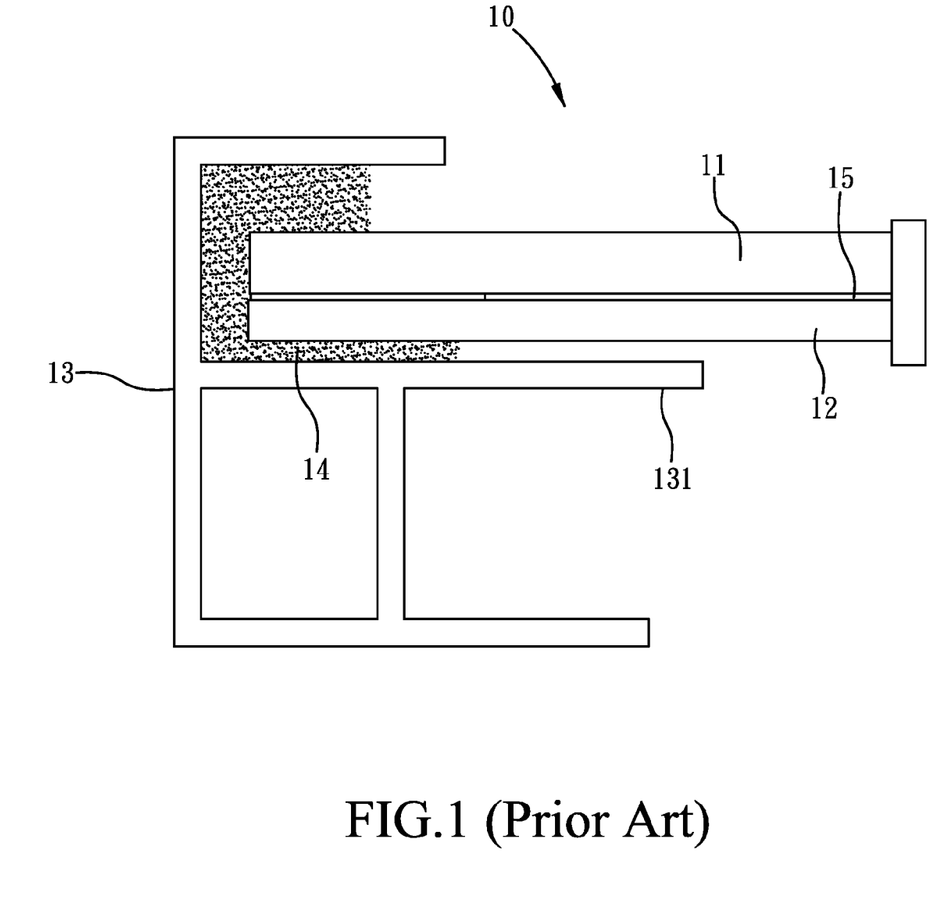
FIG. 1 is a schematic diagram showing a conventional solar cell module.

Please refer to FIG. 1, which is a schematic diagram showing a conventional solar cell module. As shown in FIG. 1, the solar cell module 10 is formed with a cover glass 11, that is disposed above a glass substrate 12 while allowing the gap formed therebetween to be filled by an environmental friendly filling material 15, such as ethylene-vinyl acetate copolymer (EVA). However, since the cover glass 11 in this conventional solar cell module 10 is formed in a size about the same as the glass substrate 12, the lower tongue piece 131 of the aluminum frame 13 will be disposed directly abutting against the bottom of the glass substrate 12 through the filling material 14, which can easily cause the cover glass 11 and glass substrate 12 to be subjected to unevenly distributed forces.

Figure 2:
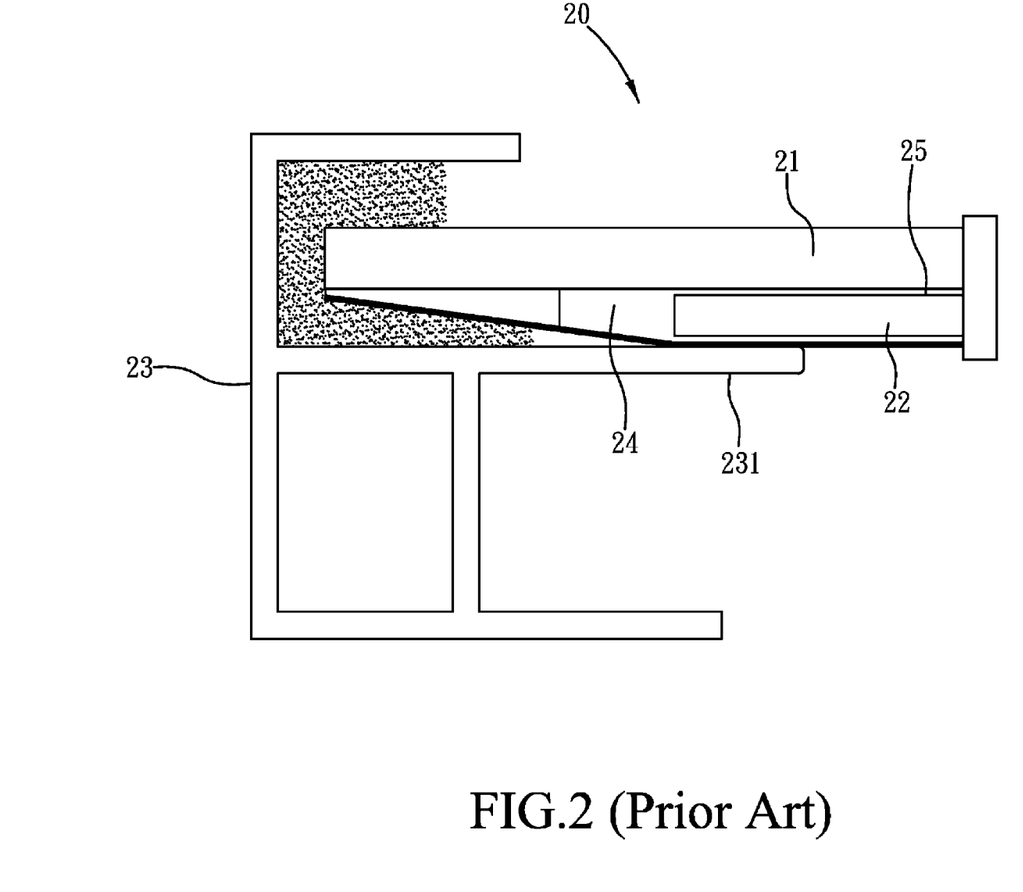
FIG. 2 is a schematic diagram showing another conventional solar cell module.
Figure 3:
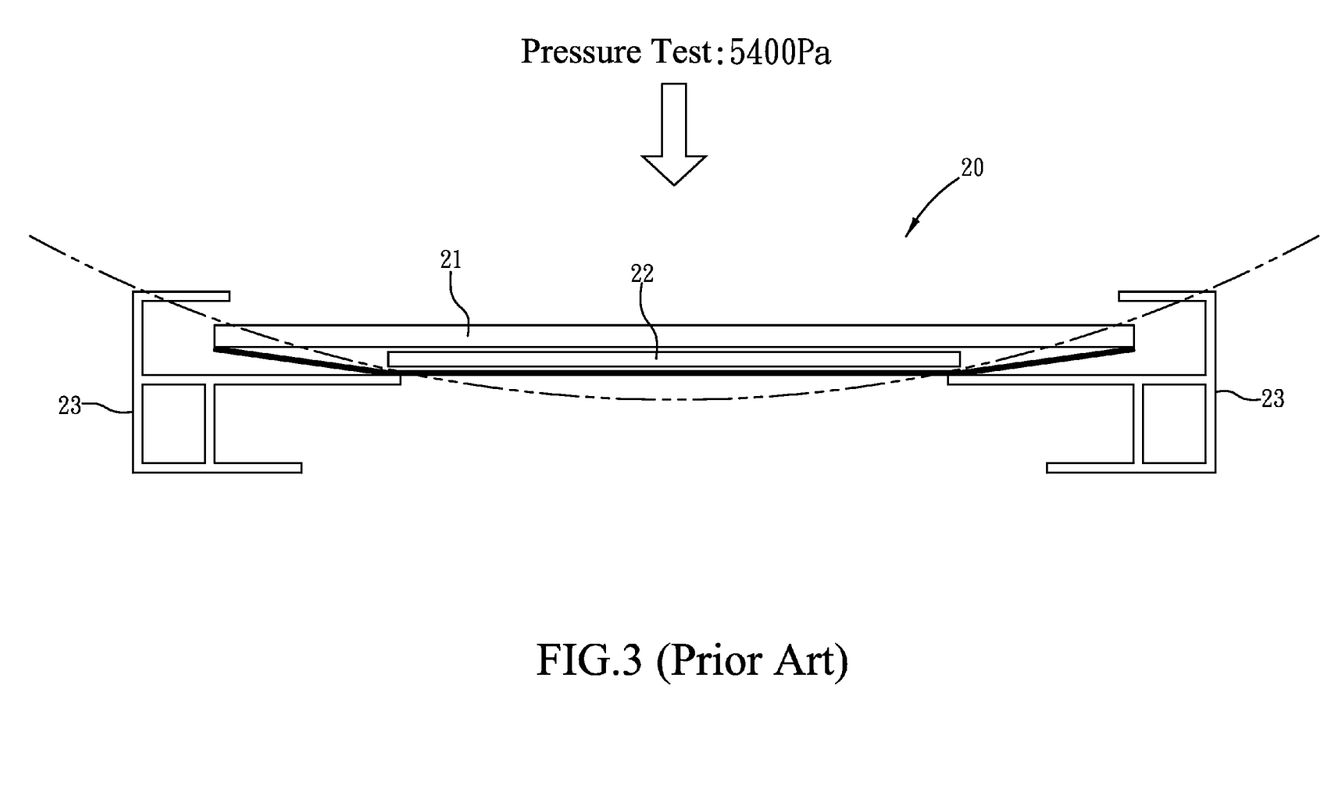
FIG. 3 is a schematic diagram showing the conventional solar cell module of FIG. 2 that is under a pressure test.

Please refer to FIG. 2 and FIG. 3, which are a schematic diagram showing another conventional solar cell module and a schematic diagram showing the conventional solar cell module of FIG. 2 that is under a pressure test. The solar cell module 20 shown in FIG. 2 is structured basically the same as the one shown in FIG. 1, but is different in that: the glass substrate 22 in this conventional solar cell module 20 is formed in a size smaller than the cover glass 21, and thus a filling material 14 is used for filling a space ranged between the perimeter of the cover glass 21 and the perimeter of the glass substrate 22. Moreover, the cover glass 21 to be disposed above the glass substrate 22 while allowing the gap formed therebetween to be filled by an environmental friendly filling material 25, such as ethylene-vinyl acetate copolymer (EVA). Nevertheless, the lower tongue piece 231 of the aluminum frame 23 is still being disposed directly abutting against the bottom of the glass substrate 22, as shown in FIG. 2.

In a pressure test for subjecting the solar cell module 20 to a pressure of 5400 Pa, both the cover glass and the glass substrate in this solar cell module 20 can easily be bended or even fractured and thus it may not be plausible for the solar cell module 20 to pass such pressure test. Consequently, in order to ensure the solar cell module 20 to pass such pressure test, the mechanical strengths of the aluminum frame 23 and the cover glass 21 should be increased. However, the measure taken for enhancing the mechanical strengths of the aluminum frame 23 and the cover glass 21 will also cause the manufacture cost of the solar cell module 20 to increase. On the other hand, it is noted that if the cover glass 21 can be fitted and assembled tightly to the aluminum frame 23 so as to form a compact structure, the solar cell module with such compact structure may be capable of withstanding a pressure higher than 5400 Pa. However, in such compact structure, any minute error in the assembling process can cause severe extruding interfere between aluminum frame 23 and the cover glass 21, which will increase the chance of fracturing, and thus the filed failure rate relating to such solar cell module is increased in consequence. Therefore, it is a tradeoff when it comes to determine how tight the aluminum frame should be fitted to the cover glass.

SUMMARY OF THE INVENTION

The primary object of the present invention is to provide a solar cell module that is compactly structured and capable of withstanding a specific pressure in a pressure test without causing its cover glass and glass substrate to be severely interfered and compressed by aluminum frame, or even fractured thereby, when the formation of the cover glass and glass substrate is bended during the pressure test.

To achieve the above object, the present invention provides a solar cell module, comprising: a cover glass, a glass substrate, and an aluminum frame; wherein, the glass substrate of the solar cell module is formed in a size smaller than that of the cover glass, whereas the cover glass is arranged above the glass substrate while being spaced from the same by a first distance; the aluminum frame is at least formed with one upper tongue piece, one lower tongue piece and a sidewall in a manner that the upper tongue piece is arranged parallel with the low tongue piece while enabling both the upper and the lower tongue pieces to be disposed and connected perpendicular to the sidewall so as to define an open accommodation space between the three to be used for receiving the cover glass and the glass substrate therein. Moreover, the solar cell module is characterized in that: the solar cell module further comprises: a filling material, being used for filling a space ranged between the perimeter of the cover glass and the perimeter of the glass substrate while allowing the cross section of the filling material to be an acute triangle, that is, the angle formed between the bottom surface of the filling material and the bottom surface of the cover glass is an acute angle, and moreover, the bottom surface of the filling material is engaged with a contact end of the lower tongue piece that is disposed away from a sidewall of the aluminum frame by a contact point while allowing the contact point to be spaced from the perimeter of the glass substrate by a second distance.

In an embodiment of the invention, the contact end of the lower tongue piece is formed as a ramp so as to engage smoothly with the bottom surface of the filling material.

In an embodiment of the invention, the contact end of the lower tongue piece is formed as a convex surface of a specific curvature so as to engage with the contact point of the filling material.

In an embodiment of the invention, the contact end of the lower tongue piece is further configured with a resilient pad that is to be for engaging to the contact point of the filling material.

In an embodiment of the invention, the contact end of the lower tongue piece is formed as a ramp, and the ramp has a resilient pad attached thereon that is to be used for engaging smoothly with the bottom surface of the filling material while allowing an end of the resilient pad that is disposed away from the sidewall to engage with the contact point.

In an embodiment of the invention, the contact end of the lower tongue piece is formed as a convex surface of a specific curvature, and the convex surface has a resilient pad attached thereon that is to be used for engaging to the contact point of the filling material.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 4:
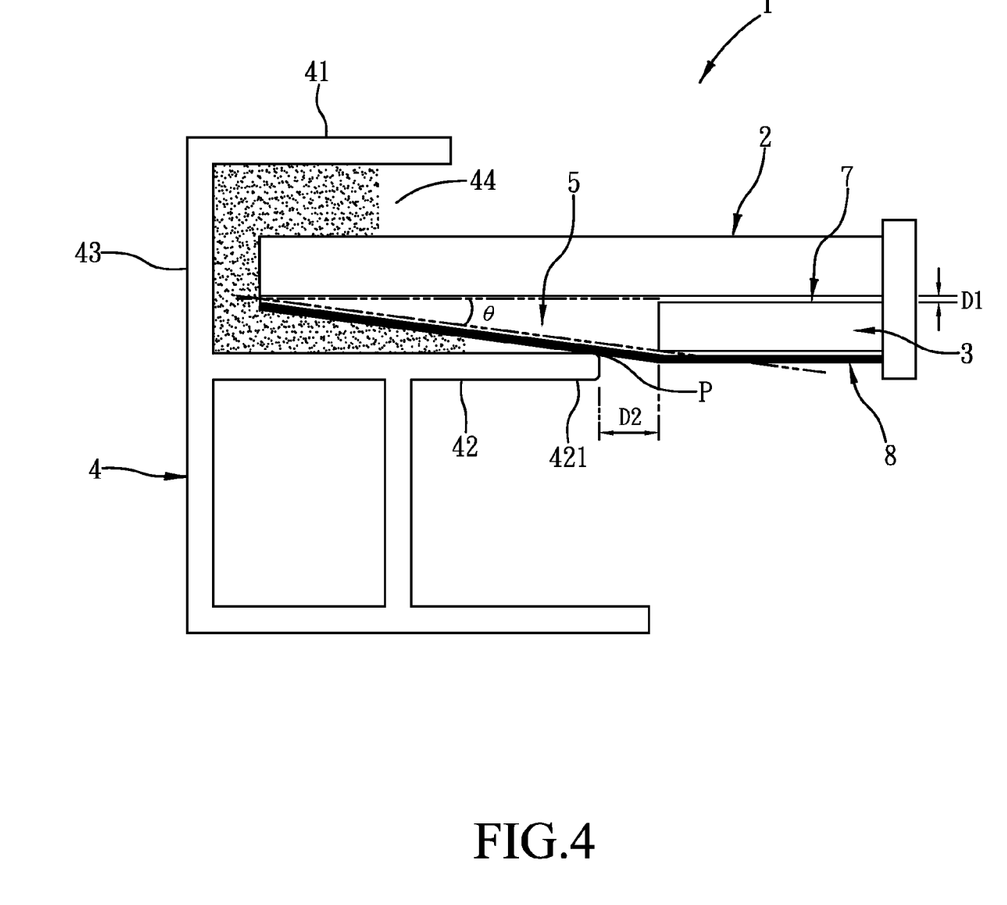
FIG. 4 is a schematic diagram showing a solar cell module according to a first embodiment of the present invention.
Figure 5:
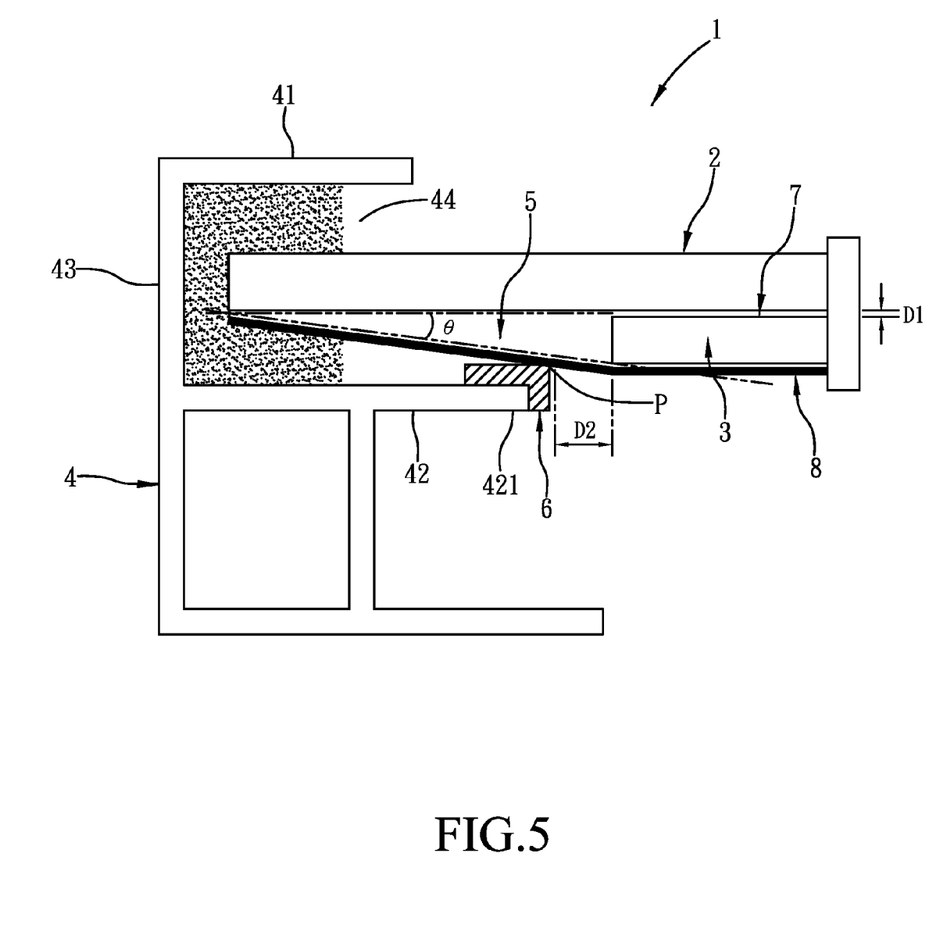
FIG. 5 is a schematic diagram showing the solar cell module of FIG. 4 that is further configured with an additional resilient pad.

Please refer to FIG. 4 and FIG. 5, which are a schematic diagram showing a solar cell module according to a first embodiment of the present invention; and a schematic diagram showing the solar cell module of FIG. 4 that is further configured with an additional resilient pad.

In this first embodiment, the solar cell module 1 comprises: a cover glass 2, a glass substrate 3, and an aluminum frame 4, in which the glass substrate 3 is formed in a size smaller than that of the cover glass 2, and the cover glass 2 is arranged above the glass substrate 3 while being spaced from the same by a first distance D1 and having an environmentally friendly filling material 7, such as EVA, sandwiched therebetween. Moreover, the aluminum frame 4 is at least formed with one upper tongue piece 41, one lower tongue piece 42 and a sidewall 43 in a manner that the upper tongue piece 41 is arranged parallel with the low tongue piece 42 while enabling both the upper and the lower tongue pieces 41 and 42 to be disposed and connected perpendicular to the sidewall 43 so as to define an open accommodation space 44 between the three to be used for receiving the cover glass 2 and the glass substrate 3 therein.

In addition, the solar cell module 1 further comprises: a filling material 5, being used for filling a space ranged between the perimeter of the cover glass 2 and the perimeter of the glass substrate 3 while allowing the cross section of the filling material 5 to be an acute triangle, that is, the angle formed between the bottom surface of the filling material 5 and the bottom surface of the cover glass 2 is an acute angle θ, and moreover, the bottom surface of the filling material 5 is engaged with a contact end 421 of the lower tongue piece 42 that is disposed away from a sidewall 43 of the aluminum frame by a contact point P while allowing the contact point P to be spaced from the perimeter of the glass substrate 3 by a second distance D2, as shown in FIG. 4.

In FIG. 5, there is further a resilient pad 6 attached to the low tongue piece 42, which is to be used for engaging to the contact point P. In this embodiment, the resilient pad 6 is an L-shaped structure. Moreover, there can further be a back film 8 attached to the bottom of the assembling of the filling material 5 and the glass substrate 3.

In reality, the filling material 5 used in FIG. 4 and the environmentally friendly filling material 7 can both be EVA. That is, they can be made of the same EVA, but in different thicknesses or the same thickness, or even they can be made of different EVAs. It is noted that EVA is a filling material with good hot-melt adhesive property that can be used for adhering and assembling two glasses together in a low-pressure heating process without itself being foamed while being heated.

Figure 6:
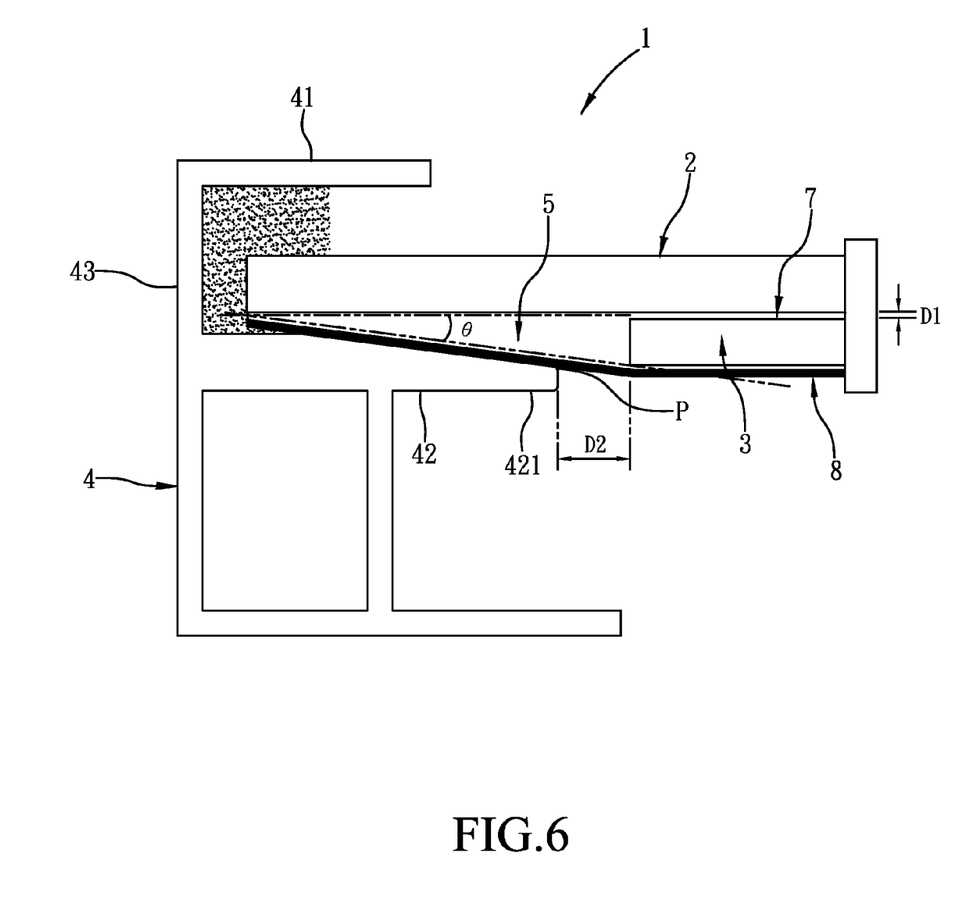
FIG. 6 is a schematic diagram showing a solar cell module according to a second embodiment of the present invention.
Figure 7:
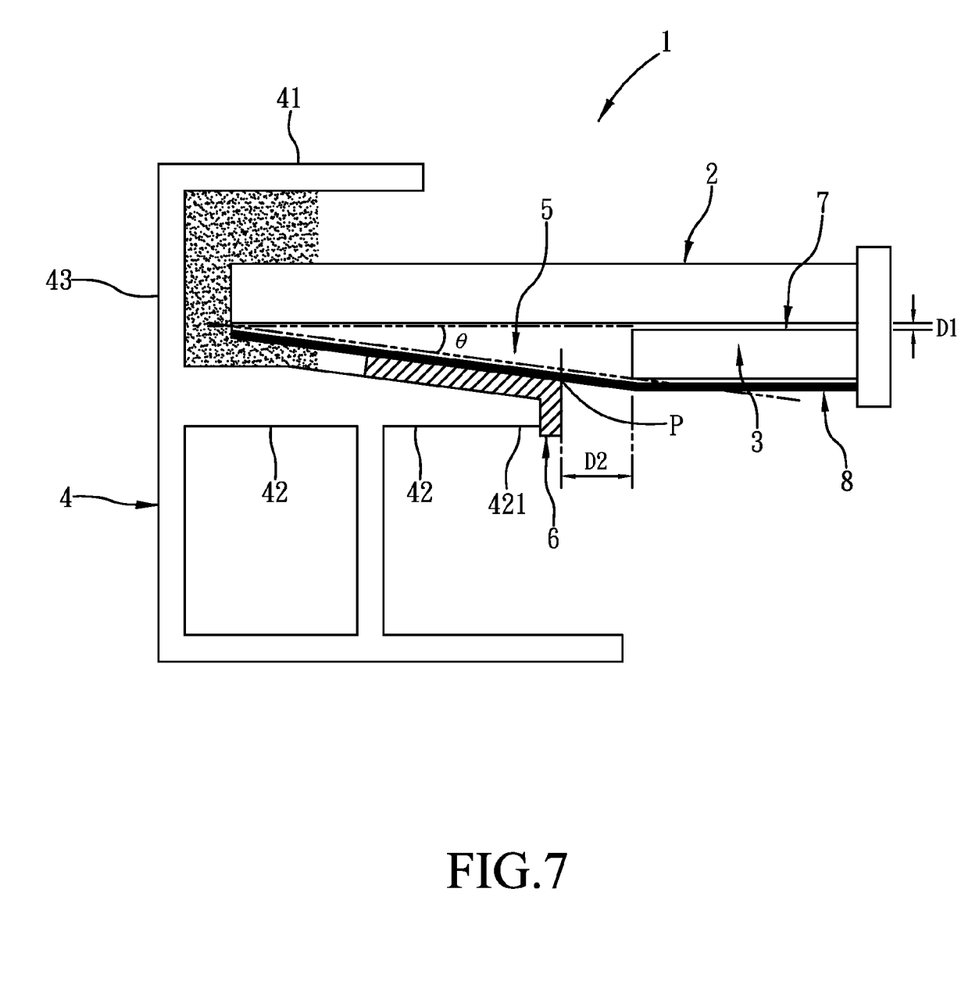
FIG. 7 is a schematic diagram showing the solar cell module of FIG. 6 that is further configured with an additional resilient pad.

Please refer to FIG. 6 and FIG. 7, which are a schematic diagram showing a solar cell module according to a second embodiment of the present invention; and a schematic diagram showing the solar cell module of FIG. 6 that is further configured with an additional resilient pad.

In this second embodiment, the solar cell module is structured basically the same as the first embodiment, and thus the same numbering is used for illustration. However, the second embodiment is different from the first embodiment in that: the contact end 421 of the lower tongue 42 is formed as a ramp so as to be engaged smoothly with the bottom surface of the filling material 5, as shown in FIG. 6.

Similarly, there can be a resilient pad 6 mounted on the ramp of the lower tongue piece 42 in a manner that resilient pad 6 is engaged smoothly with the bottom surface of the filling material 5 while allowing an end of the resilient pad 6 that is disposed away from the sidewall 43 to engage with the contact point P, as shown in FIG. 7.

Figure 8:
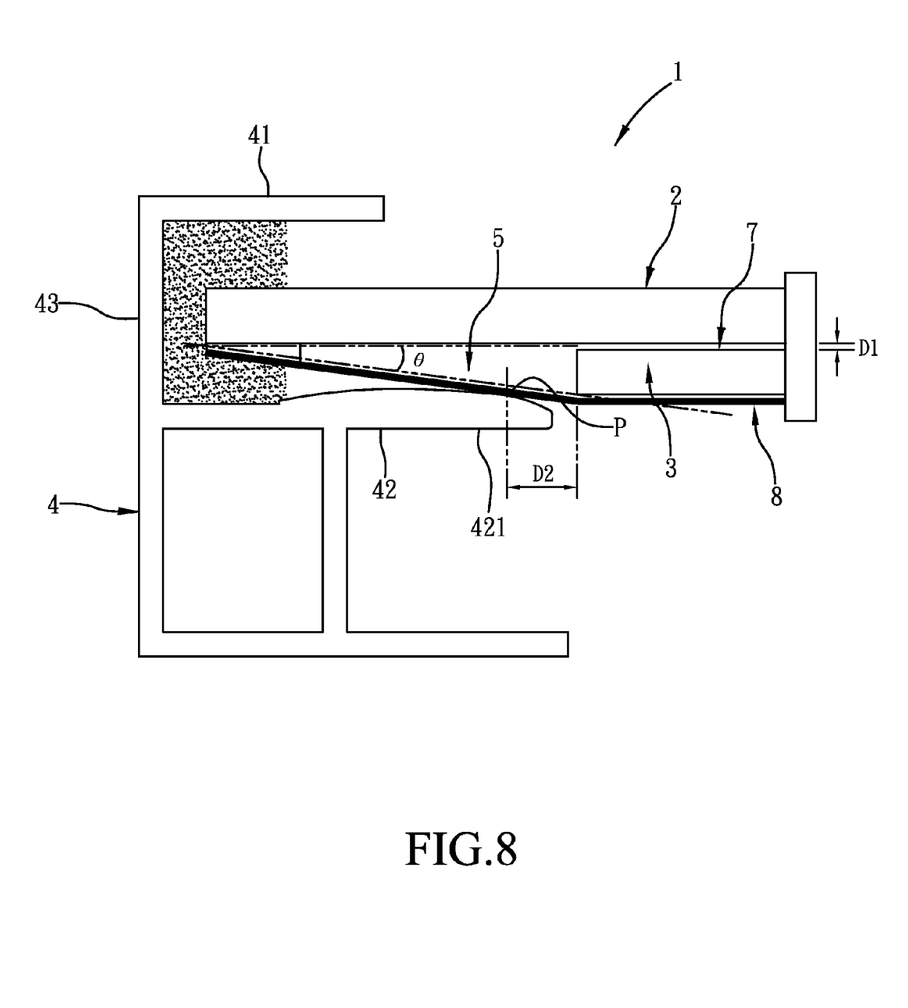
FIG. 8 is a schematic diagram showing a solar cell module according to a third embodiment of the present invention.
Figure 9:
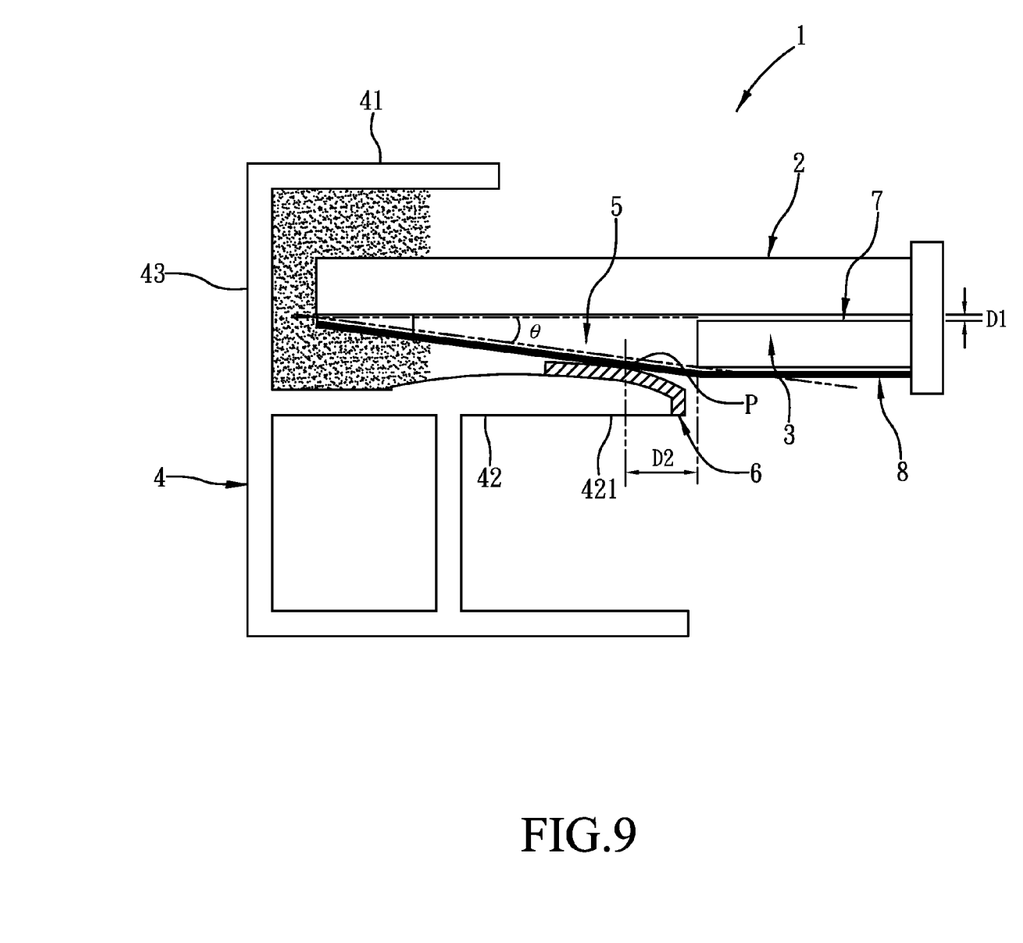
FIG. 9 is a schematic diagram showing the solar cell module of FIG. 8 that is further configured with an additional resilient pad.

Please refer to FIG. 8 and FIG. 9, which are a schematic diagram showing a solar cell module according to a third embodiment of the present invention; and a schematic diagram showing the solar cell module of FIG. 8 that is further configured with an additional resilient pad.

In this third embodiment, the solar cell module is structured basically the same as the first embodiment, and thus the same numbering is used for illustration. However, the third embodiment is different from the first embodiment in that: the contact end 421 of the lower tongue 42 is formed as a convex surface of a specific curvature so as to engage with the contact point P of the filling material 5, as shown in FIG. 8.

Similarly, there can be a resilient pad 6 mounted on the convex surface of the lower tongue piece 42 that is to be used for engaging with the contact point P of the filling material 5, as shown in FIG. 9.

By the aforesaid structures, the lower tongue piece 42 is disposed engaging directly with the filling material 5 in a manner that the glass substrate 3 will not by damaged by such engagement, since the engagement of the lower tongue piece 42 and the filling material 5 allows the contact point P to be spaced from the perimeter of the glass substrate 3 by the second distance D2. Thereby, while the solar cell module of the invention is subjected to a pressure test of 5400 Pa, the substrate will not be bended or even fractured as easily as those conventional solar cell modules did.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A solar cell module, comprising:
a cover glass, having a first perimeter;
a glass substrate, having a second perimeter disposed beneath the cover glass and offset from the first perimeter;
an aluminum frame, comprising:
an upper tongue piece, disposed above the first perimeter;
a sidewall, perpendicularly connected to the upper tongue piece, disposed adjacent to the first perimeter; and
a lower tongue piece, disposed below the first perimeter, perpendicularly connected to the sidewall and comprising a contact end distal from the sidewall, wherein said contact end comprises a contact point spaced outside said second perimeter by a distance;
a filling material, disposed between the contact point and the cover glass and directly beside and outside the second perimeter; and
a back film, disposed on a bottom surface of said glass substrate and directly connected to said first perimeter, wherein said filling material is contained by the back film within a space defined by a cross-sectional triangle formed between a first bottom corner of said first perimeter, a second bottom corner of said second perimeter, and a top corner of said second perimeter.

2. The solar cell module of claim 1, wherein said contact end tapers away from said cover glass.

3. The solar cell module of claim 1, wherein said contact end comprises a convex surface contacting said filling material.

4. The solar cell module of claim 1, further comprising an L-shaped resilient pad, disposed between and in contact with said contact end and said filling material.

5. The solar cell module of claim 1, further comprising:
an L-shaped resilient pad, disposed between and in contact with said contact end and said filling material;
wherein said contact end tapers away from said cover glass.

6. The solar cell module of claim 1, further comprising:
an L-shaped resilient pad, disposed between and in contact with said contact end and said filling material;
wherein said contact end comprises a convex surface contacting said resilient pad.

7. The solar cell module of claim 1, further comprising:
a back film, disposed on a bottom surface of said glass substrate and directly connected to said first perimeter, wherein said filling material is contained by the back film within a space defined by a cross-sectional triangle formed between a first bottom corner of said first perimeter, a second bottom corner of said second perimeter, and a top corner of said second perimeter;
wherein said contact end comprises a convex surface contacting said back film.

8. The solar cell module of claim 1, further comprising:
a back film, disposed on a bottom surface of said glass substrate and directly connected to said first perimeter, wherein said filling material is contained by the back film within a space defined by a cross-sectional triangle formed between a first bottom corner of said first perimeter, a second bottom corner of said second perimeter, and a top corner of said second perimeter; and
an L-shaped resilient pad, disposed between and in contact with said contact end and said back film.

9. The solar cell module of claim 1, further comprising:
a back film, disposed on a bottom surface of said glass substrate and directly connected to said first perimeter, wherein said filling material is contained by the back film within a space defined by a cross-sectional triangle formed between a first bottom corner of said first perimeter, a second bottom corner of said second perimeter, and a top corner of said second perimeter; and
an L-shaped resilient pad, disposed between and in contact with said contact end and said back film;
wherein said contact end tapers away from said cover glass.

10. The solar cell module of claim 1, further comprising:
a back film, disposed on a bottom surface of said glass substrate and directly connected to said first perimeter, wherein said filling material is contained by the back film within a space defined by a cross-sectional triangle formed between a first bottom corner of said first perimeter, a second bottom corner of said second perimeter, and a top corner of said second perimeter; and
an L-shaped resilient pad, disposed between and in contact with said contact end and said back film;
wherein said contact end comprises a convex surface contacting said back film.

11. The solar cell module of claim 1, wherein said filling material comprises ethylene-vinyl acetate.

* * * * *